(12) United States Patent
Hsu et al.

(10) Patent No.: US 7,476,989 B2
(45) Date of Patent: Jan. 13, 2009

(54) DYNAMIC MAGNET APPARATUS FOR GENERATING ELECTRICAL POWER

(75) Inventors: Tsang-Lin Hsu, Taipei Hsien (TW); Heng-I Lin, Taipei Hsien (TW); Suny Gang Lin, Taipei Hsien (TW); Yao-Chung Tsai, Taipei Hsien (TW)

(73) Assignee: Liung Feng Industrial Co., Ltd., Taipei Hsien (TW)

( * ) Notice: Subject to any disclaimer, the term of this patent is extended or adjusted under 35 U.S.C. 154(b) by 397 days.

(21) Appl. No.: 11/448,854

(22) Filed: Jun. 8, 2006

(65) Prior Publication Data

US 2007/0284951 A1    Dec. 13, 2007

(51) Int. Cl.
*H02K 35/00* (2006.01)

(52) U.S. Cl. ...................................................... 310/15

(58) Field of Classification Search ................... 310/15, 310/12, 13, 20, 27, 37; 366/116; 322/1; 290/1 R
See application file for complete search history.

(56) References Cited

U.S. PATENT DOCUMENTS

| | | | |
|---|---|---|---|
| 6,220,719 B1 * | 4/2001 | Vetorino et al. | 362/192 |
| 6,768,230 B2 * | 7/2004 | Cheung et al. | 310/30 |
| 6,798,090 B2 * | 9/2004 | Cheung et al. | 310/17 |
| 6,812,583 B2 * | 11/2004 | Cheung et al. | 290/1 R |
| 2008/0089168 A1 * | 4/2008 | Higuchi | 366/116 |

* cited by examiner

*Primary Examiner*—Chandrika Prasad
(74) *Attorney, Agent, or Firm*—Rosenberg, Klein & Lee

(57) ABSTRACT

A dynamic magnet apparatus for generating electrical power adapted to connect with a rectifier and accumulator, including a hollow elongated carrier having two opposite ends, a pair of fixed magnets positioned at outer surface of the opposite ends, a slidable magnet, and a supplemental weight, wherein the hallow elongated carrier is wrapped around by a number of coils, the fixed magnets disposed in polar opposition to the facing slidable magnet, the supplemental weight attached to the slidable magnet for increasing the weight of the slidable magnet. A feature of the present invention is that the supplemental weight can facilitate the slidable magnet traveling back and forth smoothly in the carrier due to a phenomenon of like pole repel of magnets. Another feature is that an inner surface of the carrier and an outer surface of the slidable magnet are of different profile in transverse for facilitating movement therebetween.

21 Claims, 6 Drawing Sheets

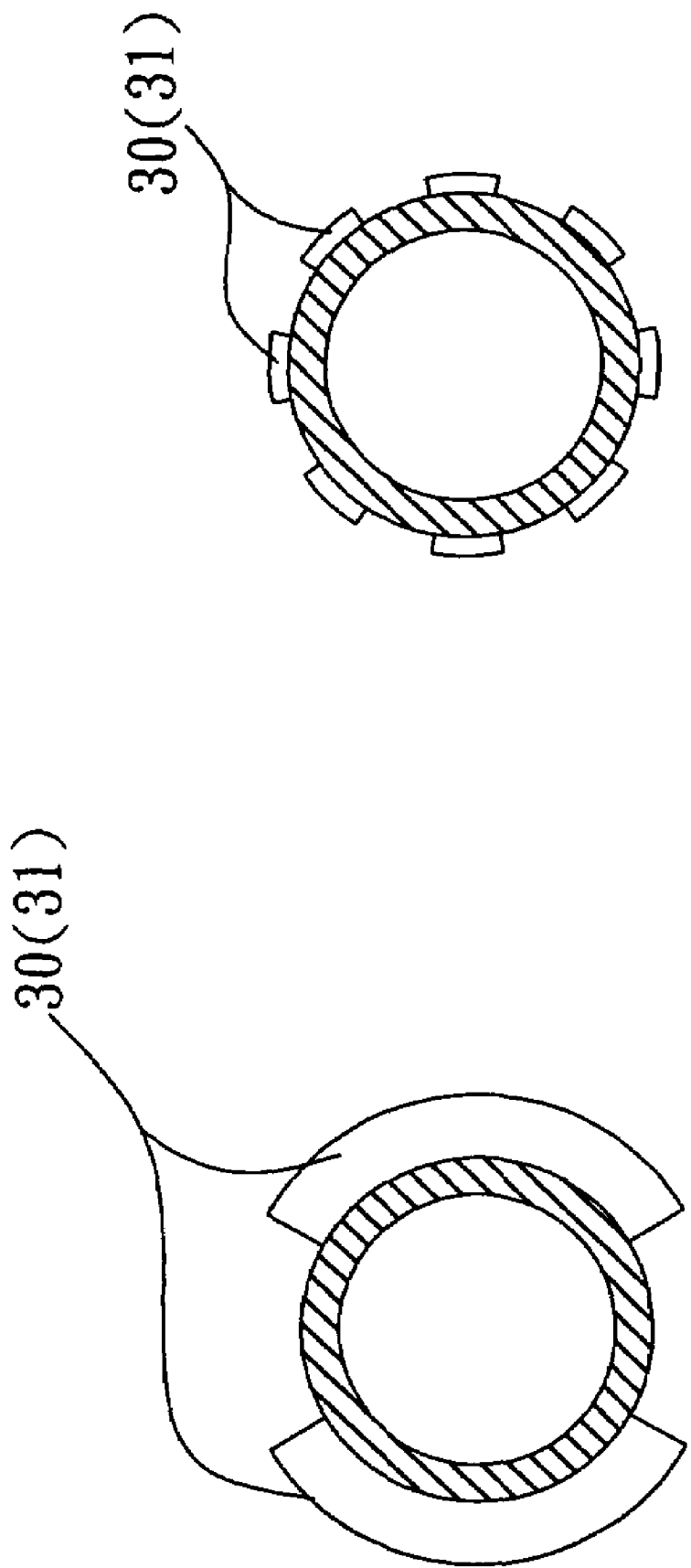

DYNAMIC MAGNET APPARATUS FOR GENERATING ELECTRICAL POWER

BACKGROUND OF THE INVENTION

1. Field of the Invention

The present invention relates to a dynamic apparatus, and particularly to a dynamic magnet apparatus for generating electrical power by a movement of magnets due to like pole repulsion.

2. Related Art

A battery is the major power supply for electronic products, especially for portable products; thus the development of the battery is most concerned in larger capacity of the electricity storage, longer lifespan, and recycling use for environment protection due to the battery is a consumptive product.

A dynamic apparatus relates to the present invention is a dynamic magnet apparatus which can generate electricity due to a phenomenon of like pole repel of magnets. A relevant magnet apparatus, for example, is disclosed in U.S. Pat. No. 6,768,230. Such magnet apparatus includes a pair of end magnets positioned at opposite ends of an enclosure for providing a magnet movement path allowing the magnet moving back and forth therein, from which kinetic energy has been generated in a coil because of the magnetic field lines cut by the turns of the wire coil and then the kinetic energy can be converted into electricity.

However, the kinetic energy may be reduced due to a higher air compressed impedance resulted from the magnet movement in the closed enclosure and friction between the enclosure and the magnet. Moreover, Faraday's law of electromagnetic induction discovered that if the magnetic field through a loop of wire varies in time then an electromotive force is induced around the loop; therefore, enhance the quality of the magnet movement is a favorable way to increase the electromotive force and electromagnetic induction efficiency. Accordingly, relevant inventions in connection with how to enhance the quality of the magnet movement are disclosed in U.S. Pat. Nos. 6,798,090, 6,220,719 and 6,812,583 in which the number of magnets is increased for raising the weight of the total magnets, or a ferrofluid is used to reduce the friction between the magnets and the enclosure in order to increase the kinetic energy. Though the weight of the magnets may be increased by afore-described methods, the cost thereof is relatively increased.

SUMMARY OF THE INVENTION

Accordingly, an object of the present invention is to provide a dynamic magnet apparatus, which can increase the kinetic energy and reduce air compressed impedance during magnet movement, whereby to have a smoothly magnet movement and generate more electromotive force.

The dynamic magnet apparatus for generating electrical power includes a hollow elongated carrier having two opposite ends, a pair of fixed magnets positioned at outer surface of the opposite ends, a slidable magnet, and a supplemental weight, wherein the hallow elongated carrier is wrapped around by a number of coils, the fixed magnets disposed in polar opposition to the facing slidable magnet, the supplemental weight attached to the slidable magnet for increasing the weight of the slidable magnet. A feature of the present invention is that the supplemental weight can facilitate the slidable magnet traveling back and forth smoothly in the carrier due to a phenomenon of like pole repel of magnets. Another feature is that an inner surface of the carrier and an outer surface of the slidable magnet are of different profile in transverse for facilitating movement therebetween

BRIEF DESCRIPTION OF THE DRAWINGS

FIGS. 1A and 1B are a second and third embodiments in accordance with the present invention, respectively;

DESCRIPTION OF THE PREFERRED EMBODIMENTS

Figure 1:
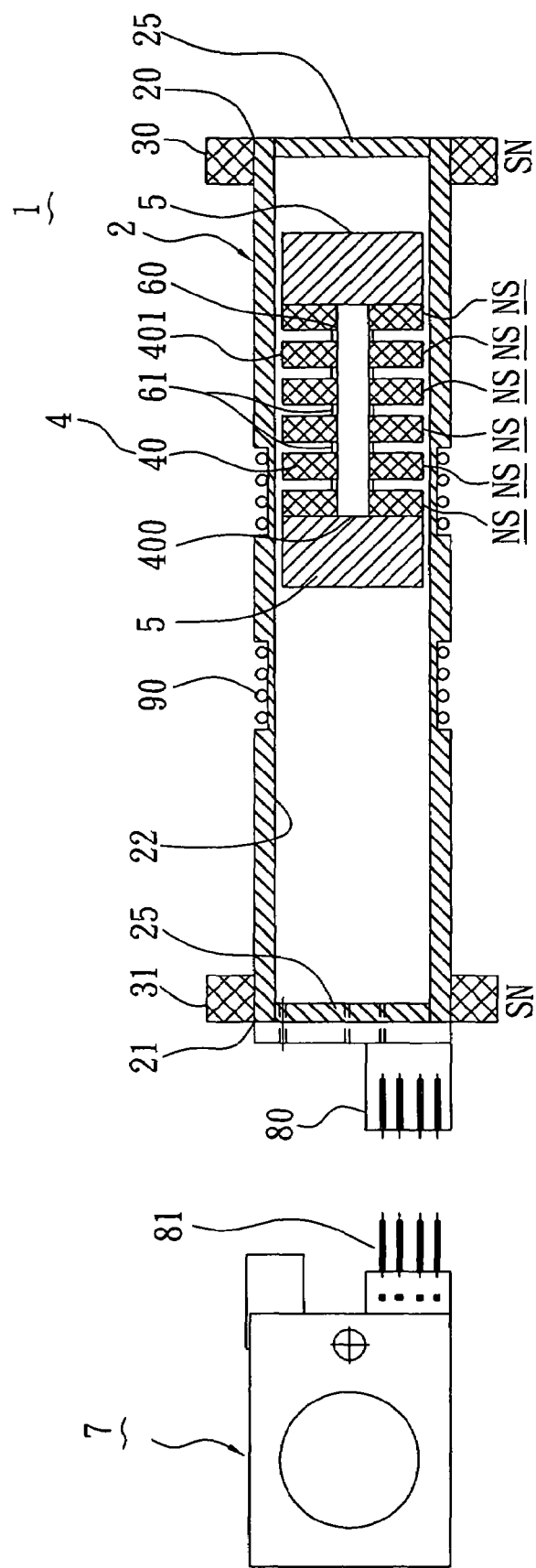
FIG. 1 is a schematic cross-sectional view of a first embodiment in accordance with a present invention and a rectifier and accumulator.

Referring to FIG. 1, a dynamic magnet apparatus 1 of the present invention can generate electrical power by slightly shaking and can transmit electricity to electronic products through connect with a receptacle connector 81 of a rectifier and accumulator 7. The dynamic magnet apparatus 1 includes a hollow elongated carrier 2, a pair of fixed magnets 30, 31, a slidable magnet series 4 and a supplemental weight 5, wherein the hallow elongated carrier 2 wrapped around by a number of coils 90 has two opposite ends 20, 21. The fixed magnets 30, 31 are disposed in polar opposition to the facing slidable magnet series 4 and positioned at outer surface of the opposite ends 20, 21 of the hollow elongated carrier 2. The fixed magnets 30, 31 are of annular shape; further referring to FIGS. 1A and 1B respectively illustrating a second and third embodiments, the fixed magnets 30, 31 are of annular-shaped, arcuated-shaped or a number of small magnets.

The invention employs multiple slidable magnets 40 as shown in FIG. 1 in accordance with the first embodiment, a number of the slidable magnet series 4 is six, wherein each slidable magnet 40 forms a coupling hole 400 along an axis. The coupling holes 400 of the slidable magnets 40 are coupled by a rod 60, and a spaced element 61 disposed therebetween, and then accommodated in the carrier 2. The rod 60 is a screw rod, and the spaced element 61 is a screw cap (or a screw nut, a pad). The multiple slidable magnets in the first embodiment are arranged in polar opposition to each other. The supplemental weight 5 is attached to lateral side of the slidable magnet 40 for increasing the weight of the slidable magnet 40. The supplemental weight 5 is made of brass or carbon-steel material.

Figure 3:
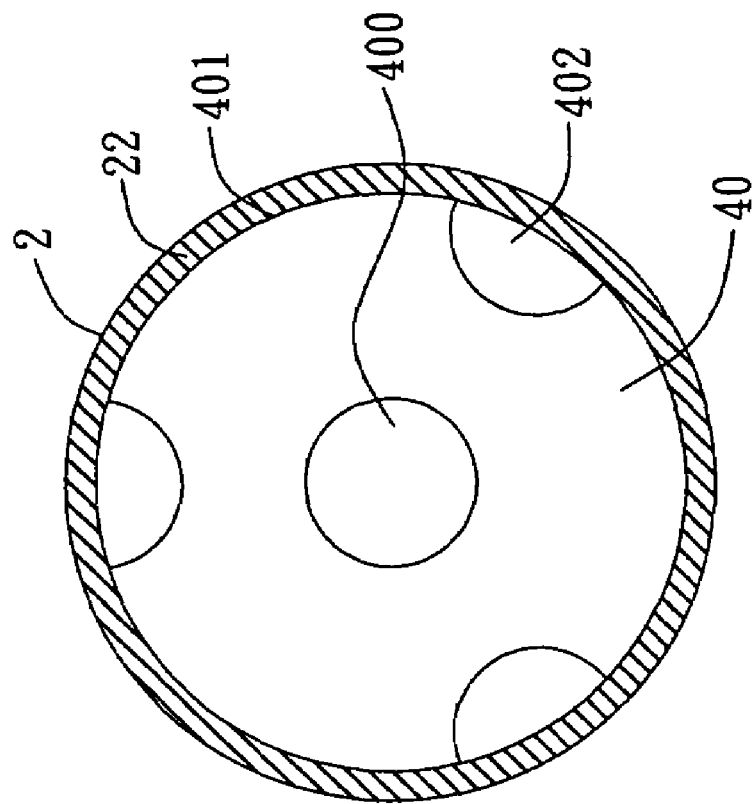
FIGS. 2 and 3 are cross-sectional views illustrating slidable magnets of different profile respectively in the first and second embodiments in accordance with the present invention.
Figure 2:
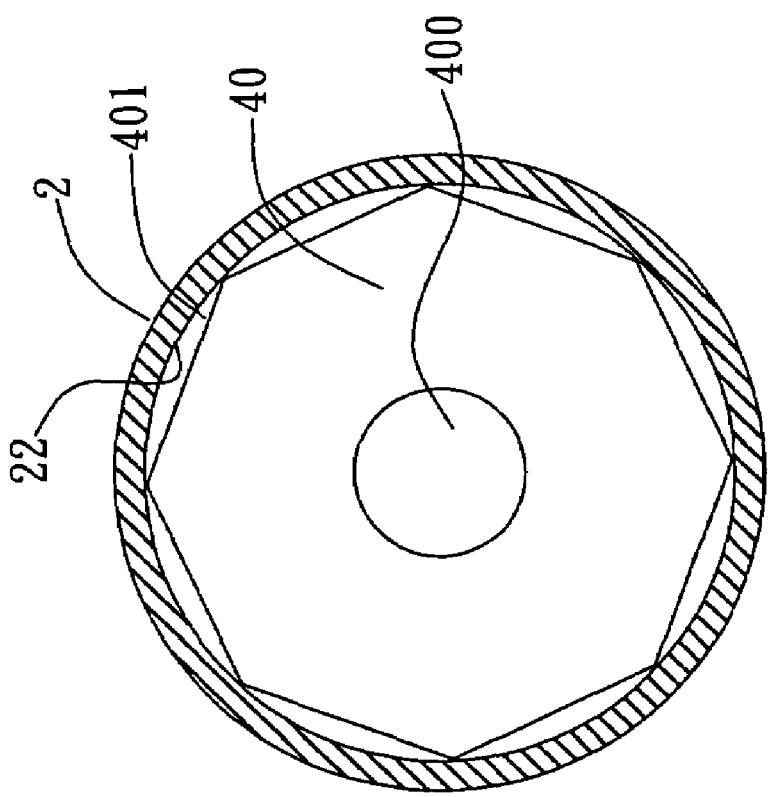
Figure 5:
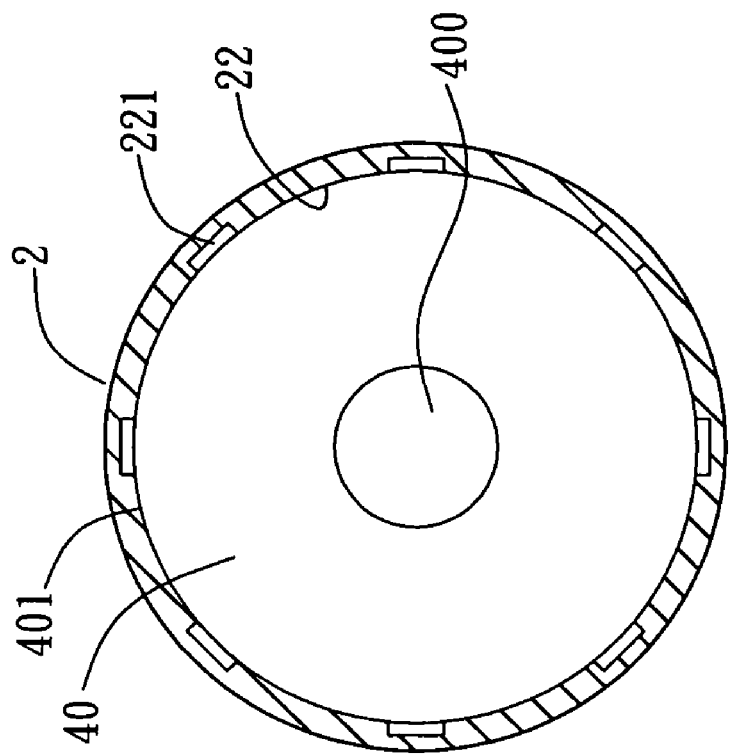
FIGS. 4 and 5 are cross-sectional views illustrating inner surfaces of a carrier of different profile respectively in the first and second embodiments in accordance with the present invention.
Figure 4:
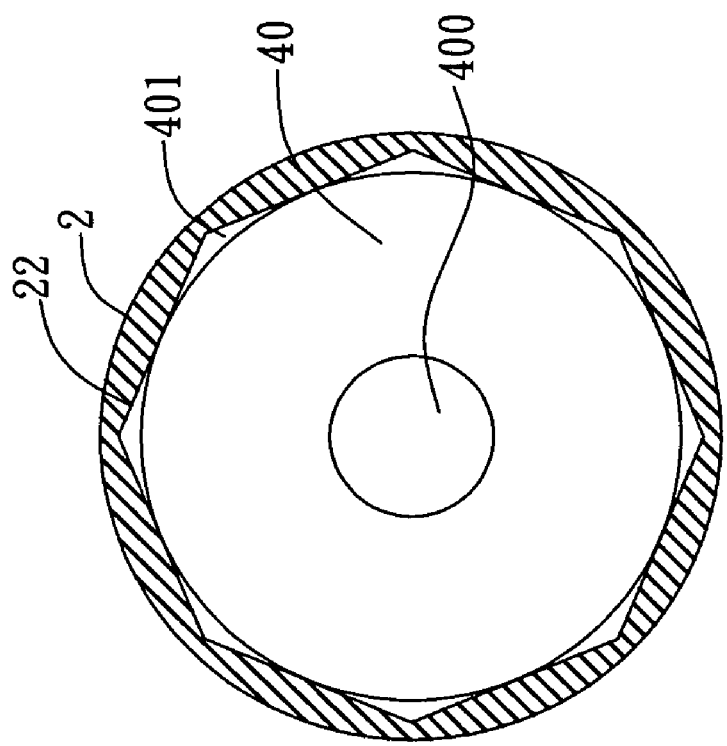

Referring to FIGS. 2 to 5, an inner surface 22 of the carrier 2 and an outer surface 401 of the slidable magnet 40 are of different profile in transverse for facilitating movement therebetween. As shown in FIG. 2, the inner surface 22 of the carrier 2 is of round-shaped whereas the outer surface 401 of the slidable magnet 40 is of polygon-shaped. FIG. 3 is the second embodiment of the invention, in which the inner surface 22 of the carrier 2 is of round-shaped whereas the outer surface 401 of the slidable magnet 40 has a plurality of recesses 402. FIG. 4 illustrates another combination of different shape of the carrier 2 and the slidable magnet 40, in which the inner surface 22 of the carrier 2 is of polygon-shaped whereas the outer surface 401 of the slidable magnet 40 is of round-shaped. In FIG. 5, the inner surface 22 of the carrier 2 is of round-shaped and further has a plurality of recesses 221 whereas the outer surface 401 of the slidable magnet 40 is of round-shaped. Consequently, a gape is formed between the inner surface 22 of the carrier 2 and the outer surface 401 of the slidable magnet 40 due to the different profile thereof, respectively. Such gape providing spaces for reducing air compressed impedance.

Figure 6:
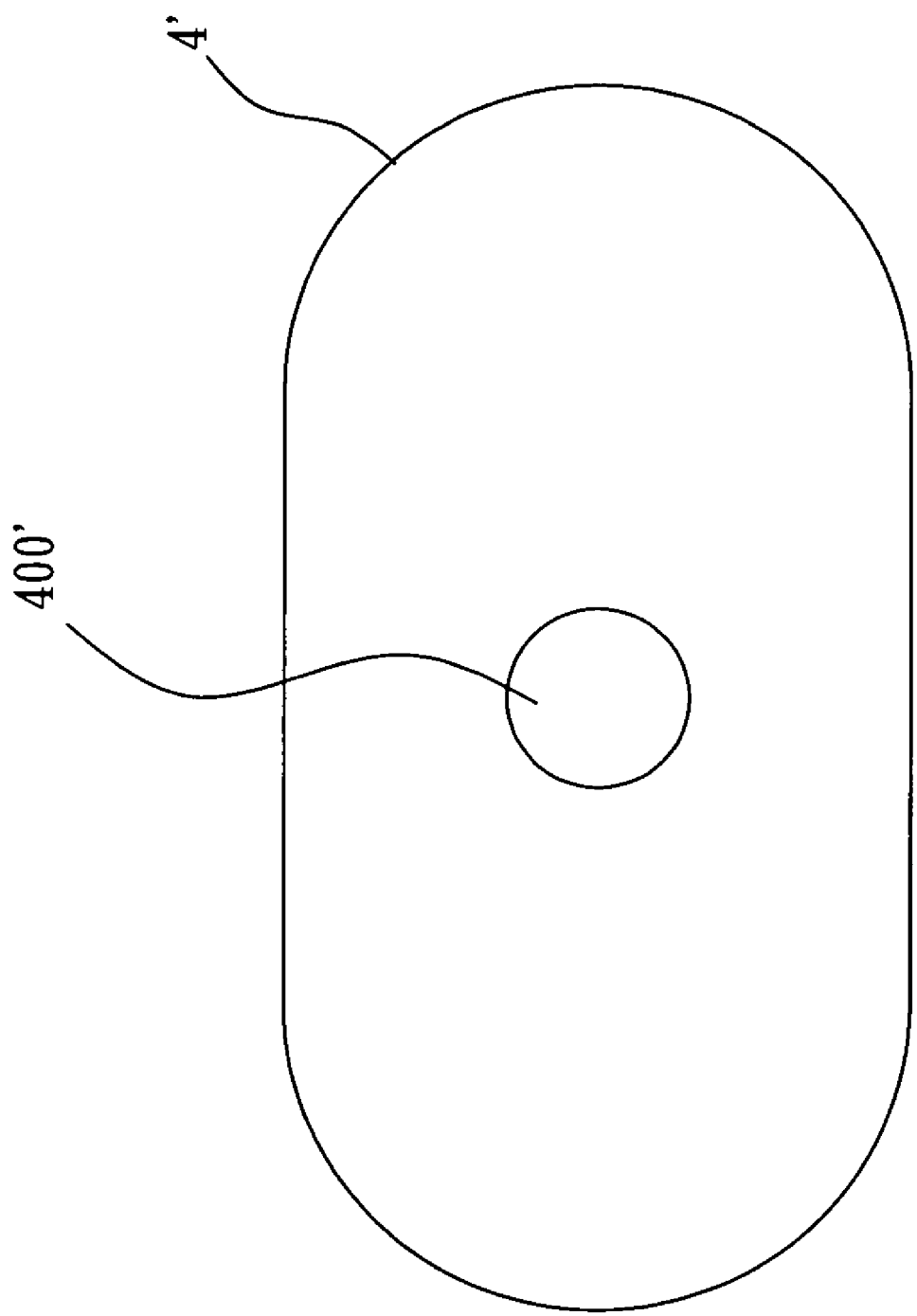
FIG. 6 is a plan view illustrating the slidable magnet of ellipse-shaped in accordance with the present invention.

Furthermore, the slidable magnets 40 can be arranged in polar opposition to each other with facing ends of like magnetic polarity, or in polar attraction to each other with facing ends of opposite magnetic polarity, or in hybrid magnetic polarity arrangement; whereby, the slidable magnets 40 mutually repel each other and travel back and forth within a path limited by the fixed magnets 30, 31 at the end of the outer surface of the hollow elongated carrier 2. The kinetic energy of the moving magnets 40 is converted to a current in the coils 90 and then turns to electromotive force as electrical power. Moreover, in the second embodiment of the present invention, the slidable magnet 4' is ellipse-shaped as shown in FIG. 6 and forms a coupling hole 400' along an axis thereof. In combination with a similar ellipse-shaped carrier 2', the slidable magnet 4' can reduce air compressed impedance during the movement in the carrier.

Figure 7:
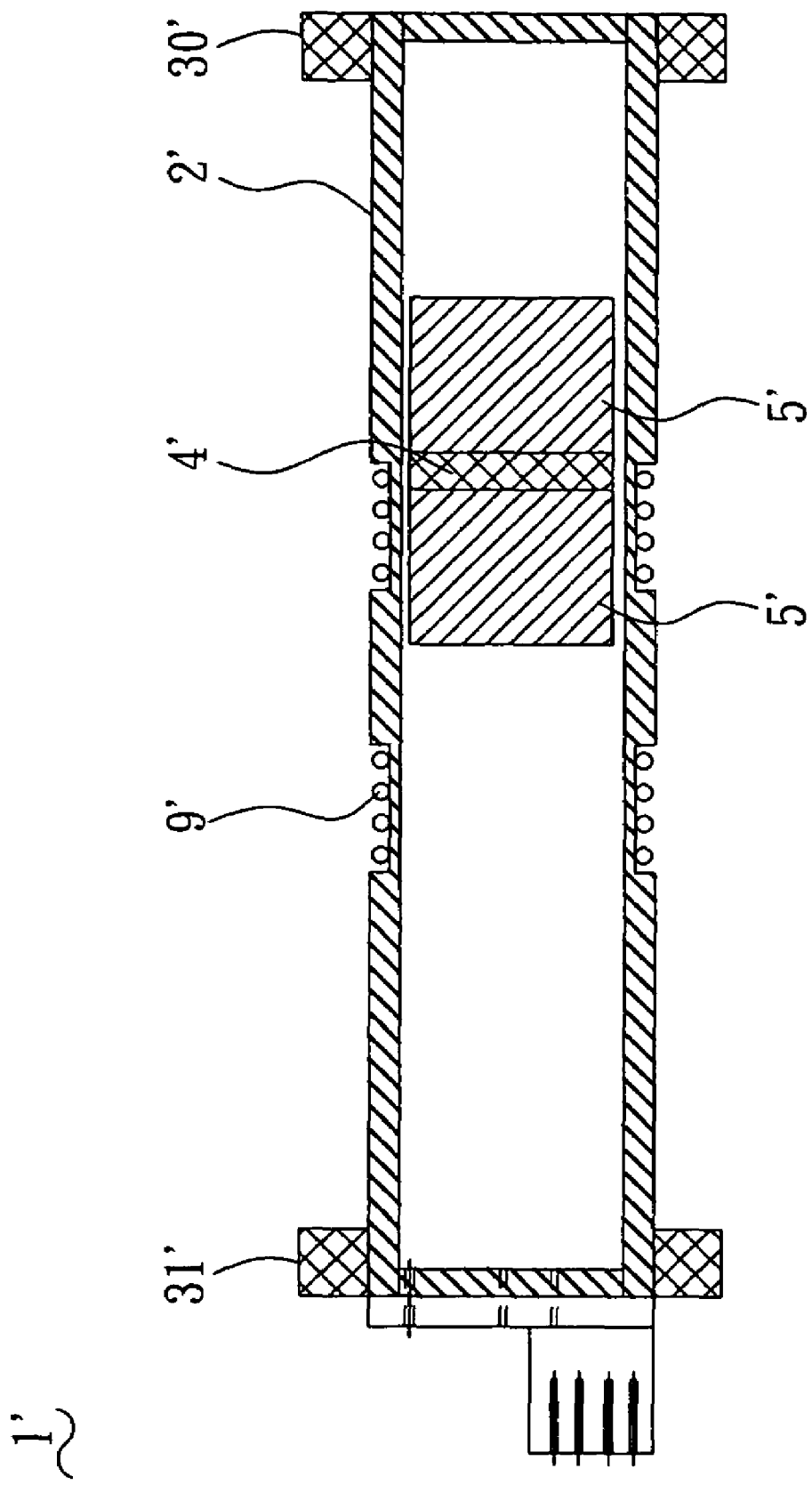
FIG. 7 is a cross-sectional view of the second embodiment in accordance with the present invention.

Further referring to FIG. 7 illustrating the second embodiment of the present invention, the dynamic magnet apparatus 1' includes only one slidable magnet 4' in the carrier 2', and a pair of weighted supplemental weights 5' attached to the slidable magnet 4'. The single slidable magnet 4' with the weighted supplemental weights 5' can also facilitate the slidable magnet 4' traveling back and forth smoothly in the carrier 2'. The weighted supplemental weights 5' are made of brass or carbon-steel material of which the cost are lower in assembly than adding more slidable magnet 4' and the assembly can be simplified.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A dynamic magnet apparatus for generating electrical power adapted to connect with a rectifier and accumulator, comprising:
    a hollow elongated carrier including two opposite ends, at least one end thereof forming an opening, the carrier wrapped around by a number of coils;
    at least one slidable magnet disposed in the hollow elongated carrier;
    a pair of fixed magnets positioned at outer surface of the opposite ends of the hollow elongated carrier, each fixed magnet being in polar opposition to the slidable magnet, with facing ends of like magnetic polarity;
    a supplemental weight attached to the slidable magnet; and
    a cover covering the opening;
    wherein the slidable magnet, which cooperates with the supplemental weight and therefore has more inertia, slides back and forth in the carrier more easily and increase the efficiency of electromagnetic induction in the coils due to the magnetic field lines cut by the turns of the coils completely.

2. The dynamic magnet apparatus for generating electrical power as claimed in claim 1, wherein the supplemental weight and the slidable magnet are of similar shape.

3. The dynamic magnet apparatus for generating electrical power as claimed in claim 2, wherein the supplemental weight is made of brass or carbon-steel material.

4. The dynamic magnet apparatus for generating electrical power as claimed in claim 1, wherein the fixed magnets can be annular-shaped, arcuated-shaped or a number of small magnets.

5. The dynamic magnet apparatus for generating electrical power as claimed in claim 4, wherein a coupling hole is formed along an axis of the slidable magnet.

6. The dynamic magnet apparatus for generating electrical power as claimed in claim 5, wherein a plurality of recesses are formed on outer surface of the slidable magnet.

7. The dynamic magnet apparatus for generating electrical power as claimed in claim 6, wherein the recesses are further formed on inner surface of the hollow elongated carrier.

8. The dynamic magnet apparatus for generating electrical power as claimed in claim 2, wherein the inner surface of the carrier and the outer surface of the slidable magnet are of different profile in transverse for facilitating relative movement therebetween; wherein, the inner surface of the carrier is of polygon-shaped and the outer surface of the slidable magnet is of round-shaped, or in contrary to each other.

9. The dynamic magnet apparatus for generating electrical power as claimed in claim 8, wherein a coupling hole is formed along an axis of the slidable magnet.

10. The dynamic magnet apparatus for generating electrical power as claimed in claim 1, further comprising a plurality of the slidable magnets which can be arranged in polar opposition to each other or in polar attraction to each other or in hybrid magnetic polarity arrangement.

11. The dynamic magnet apparatus for generating electrical power as claimed in claim 10, wherein the slidable magnets are coupled by a rod and a spaced element disposed therebetween for spacing each slidable magnet.

12. The dynamic magnet apparatus for generating electrical power as claimed in claim 10, wherein the rod is a screw rod, and the spaced element is a screw cap, screw nut, or a pad.

13. A dynamic magnet apparatus for generating electrical power adapted to connect with a rectifier and accumulator, comprising:
    a hollow elongated carrier including two opposite ends, at least one end thereof forming an opening, the carrier wrapped around by coils;
    at least one slidable magnet disposed in the hollow elongated carrier;
    a pair of fixed magnets positioned at outer surface of the opposite ends of the hollow elongated carrier, the fixed magnets disposed in polar opposition to the slidable magnet; and
    a cover covering the opening;
    wherein the inner surface of the carrier and the outer surface of the slidable magnet are of different profile in transverse for reducing air compressed impedance whereby to facilitate the movement of the slidable magnet.

14. The dynamic magnet apparatus for generating electrical power as claimed in claim 13, further comprising a plurality of the slidable magnets which can be arranged in polar opposition to each other or in polar attraction to each other or in hybrid magnetic polarity arrangement.

15. The dynamic magnet apparatus for generating electrical power as claimed in claim 14, wherein a coupling hole is formed along an axis of the slidable magnet.

16. The dynamic magnet apparatus for generating electrical power as claimed in claim 15, wherein the inner surface of the carrier in transverse is of polygon-shaped, and the outer surface of the slidable magnet in transverse is of round-shaped.

17. The dynamic magnet apparatus for generating electrical power as claimed in claim 16, wherein the inner surface of the carrier is of round-shaped in transverse, and the outer surface of the slidable magnet is of polygon-shaped in transverse.

18. The dynamic magnet apparatus for generating electrical power as claimed in claim 13, wherein the fixed magnets can be annular-shaped, arcuated-shaped or a number of small magnets.

19. The dynamic magnet apparatus for generating electrical power as claimed in claim 14, wherein the slidable magnets are coupled by a rod and a spaced element disposed therebetween for spacing each slidable magnet.

20. The dynamic magnet apparatus for generating electrical power as claimed in claim 19, wherein the rod is a screw rod, and the spaced element is a screw cap, screw nut, or a pad.

21. A dynamic magnet apparatus for generating electrical power adapted to connect with a rectifier and accumulator, comprising:
  a hollow elongated carrier including two opposite ends, at least one end thereof forming an opening, the carrier wrapped around by coils;
  at least one slidable magnet disposed in the hollow elongated carrier;
  a pair of fixed magnets positioned at outer surface of the opposite ends of the hollow elongated carrier, each fixed magnet being in polar opposition to the slidable magnet, with facing ends of like magnetic polarity; and
  a cover covering the opening.

* * * * *